(12) United States Patent
Saunders et al.

(10) Patent No.: US 8,290,315 B2
(45) Date of Patent: Oct. 16, 2012

(54) TEMPERATURE SENSING

(75) Inventors: Paul Vincent Saunders, Isle of Wight (GB); Giovanni Antonio Marengo, Isle of Wight (GB)

(73) Assignee: GKN Aerospace Services Limited, East Cowes, Isle of Wight (GB)

( * ) Notice: Subject to any disclaimer, the term of this patent is extended or adjusted under 35 U.S.C. 154(b) by 71 days.

(21) Appl. No.: 12/524,330

(22) PCT Filed: Jan. 24, 2008

(86) PCT No.: PCT/GB2008/000248
§ 371 (c)(1), (2), (4) Date: Jul. 23, 2009

(87) PCT Pub. No.: WO2008/090348
PCT Pub. Date: Jul. 31, 2008

(65) Prior Publication Data
US 2010/0080501 A1    Apr. 1, 2010

(30) Foreign Application Priority Data
Jan. 24, 2007    (EP) .................................... 07250287

(51) Int. Cl.
*G02B 6/00*    (2006.01)
(52) U.S. Cl. .................. 385/12; 374/161; 374/E11.016; 29/709
(58) Field of Classification Search .................... 385/12; 29/709; 374/161, E11.016
See application file for complete search history.

(56) References Cited

U.S. PATENT DOCUMENTS

| | | | | |
|---|---|---|---|---|
| 5,042,898 | A | * | 8/1991 | Morey et al. ..................... 385/37 |
| 5,367,589 | A | * | 11/1994 | MacDonald et al. ........... 385/37 |
| 5,602,949 | A | * | 2/1997 | Epworth ......................... 385/37 |
| 5,694,503 | A | * | 12/1997 | Fleming et al. ................. 385/37 |
| 5,805,757 | A | | 9/1998 | Bloom |
| 5,887,107 | A | * | 3/1999 | Newman et al. .............. 385/137 |
| 5,991,483 | A | * | 11/1999 | Engelberth ...................... 385/37 |
| 6,122,430 | A | * | 9/2000 | Bookbinder et al. .......... 385/137 |
| 6,233,746 | B1 | * | 5/2001 | Skinner .................... 250/227.18 |
| 6,256,090 | B1 | * | 7/2001 | Chen et al. .................... 356/73.1 |
| 6,374,014 | B1 | * | 4/2002 | Jablonski ......................... 385/37 |
| 6,384,404 | B1 | * | 5/2002 | Berg ........................ 250/227.16 |

(Continued)

FOREIGN PATENT DOCUMENTS
EP    0 713 084 A    5/1996
(Continued)

OTHER PUBLICATIONS

European Search Report for corresponding European Application No. 07250287.5-2209; dated Jul. 3, 2007.

(Continued)

*Primary Examiner* — Ellen Kim
(74) *Attorney, Agent, or Firm* — Quarles & Brady LLP

(57) ABSTRACT

A temperature sensor array comprises an optical fiber (16) on which are a plurality of Bragg gratings (18) on respective spaced apart portions of the fiber. Each portion is in a housing (14) which freely houses the said portion substantially without axial strain on the fiber within the housing and which also isolates the grating from strain imposed on the fiber outside the housing. Thus substantially only changes in temperature affect the Bragg grating of that portion. The array may be used to detect and control the temperature of a tool (12) for forming a composite component amongst other uses.

28 Claims, 12 Drawing Sheets

U.S. PATENT DOCUMENTS

| | | | |
|---|---|---|---|
| 6,603,900 B1 * | 8/2003 | Bookbinder et al. | 385/37 |
| 6,915,041 B2 * | 7/2005 | Bulman et al. | 385/37 |
| 7,218,816 B2 * | 5/2007 | Shinozaki et al. | 385/37 |
| 2006/0285813 A1 * | 12/2006 | Ferguson | 385/138 |

FOREIGN PATENT DOCUMENTS

| | | |
|---|---|---|
| JP | 2000-030162 | 1/2000 |
| WO | 00/39548 A2 | 7/2000 |
| WO | 01/20380 A1 | 3/2001 |
| WO | 01/38838 A | 5/2001 |
| WO | 03/076887 | 9/2003 |

OTHER PUBLICATIONS

The International Search Report and Written Opinion as mailed on May 19, 2009 for International Patent Application PCT/GB2008/000248.

IPRP under date of mailing of Apr. 2, 2009 for International Patent Application PCT/GB2008/000248.

"Notice of Reasons for Rejection" from Japanese Patent Office (Translated into English) for corresponding Japanese patent application No. 2009-546808; mailed Jun. 19, 2012; 6 pages.

* cited by examiner

TEMPERATURE SENSING

CROSS REFERENCE TO RELATED APPLICATIONS

This application represents the national stage application of International application PCT/GB2008/000248 filed 24 Jan. 2008, which claims the benefit of European Patent Application 07250287.5 files 24 Jan. 2007, which are incorporated herein by reference in their entirety for all purposes.

BACKGROUND

The present invention relates to sensing temperature, for example for a tool for forming a composite component.

It is known to make composite components of composite materials using a tool having one or more heaters embedded in the tool. It is necessary to monitor and/or control the temperature of the tool during a cure cycle. Normally thermocouples have been used but they have several disadvantages. A single thermocouple monitors only a localised area and many thermocouples are needed on a larger tool resulting in multiple wires and connections. Normally, thermocouples are placed just outside the edge of the component being formed in "spare" material which is removed from the component after it is formed. Furthermore, thermocouples and their wiring may embed themselves into the material being formed resulting in damage to, and replacement of, wiring after the composite material has been removed from the tool, and recalibration of the thermocouples if they are reused. Thermocouples are not used to directly monitor the material of the component itself (i.e., the material which is not discarded) because they may become embedded in the component or otherwise mark the surface of the component.

A fibre optic sensor using a Bragg grating has been proposed for sensing a variable for example temperature or the concentration of a chemical species. It is known to provide many Bragg gratings distributed on an optical fibre to sense strain on the fibre. It is also known to use Wavelength Division Multiplex or Time Division Multiplex techniques to address the respective gratings on the fibre.

WO 00/39548 discloses an array of gratings distributed along a fibre, each grating being on a portion of fibre encased within, and fused to, a cylindrical glass tube, which may have a coefficient of thermal expansion mis-matched with that of the fibre to increase the sensitivity of the grating to temperature changes by applying strain to the grating. The glass tube also reduces the sensitivity of the grating to axial strain on the fibre outside the tube. However, because the tube is fused to the fibre, axial strain on the fibre is transmitted to the fibre within the tube so the value sensed by the grating within the tube is not independent of axial strain on the fibre.

WO 03/076887 discloses the use of an optical fibre that includes one or more Bragg gratings that are responsive to strain and are for use in large structures such as ships, bridges and oil drilling and production rigs. This document also discloses that a Bragg grating can be placed in a package that isolates the grating from strain with the purpose of providing a temperature measurement that can be used to compensate for the thermal signal measured by the strain responsive grating. Accordingly, WO 03/076887 describes the use of a Bragg grating to provide for temperature compensation, rather than for actual temperature measurement. One example of a strain isolating package disclosed in WO 03/076887 receives a loop of the optical fibre in a circular groove in a disc, the optical fibre entering and exiting the circular groove tangentially to the circular groove. This strain isolating package has the disadvantages that it is relatively large and further involves the optical fibre intersecting, or crossing over, itself where the optical fibre enters and leaves the circular groove. Another example of a strain isolating package, described as being to provide a more compact arrangement, involves a straight length of the optical fibre with the Bragg grating being placed on a high elastic modulus material, a stiffener and fixed to the stiffener using a high modulus adhesive. The optical fibre and stiffener a further encapsulated in a lower elastic modulus polymer to reduce strain concentrations in the optical fibre at either end of the stiffener. This strain isolating package has complex construction.

Accordingly, the invention seeks to provide a temperature sensor that has a compact and inexpensive construction and that is useful in a tool for forming a component of composite materials and to provide a temperature sensor array and a tool incorporating such a temperature sensor or a temperature sensor array.

SUMMARY OF THE INVENTION

An aspect of the invention provides an apparatus comprising an optical fibre and a strain isolating housing. The housing defines a cavity and defines an entry to the cavity and an exit from the cavity. The optical fibre is arranged to enter the housing at the entry and to exit the housing at the exit and is secured to the housing at a first securing location in the region of said entry and at a second securing location in the region of said exit. The optical fibre includes a Bragg grating within the housing and extends within the cavity between the entry and the exit along an non-intersecting path that has at least one unsecured arcuate portion such that the portion at which the Bragg grating is formed is substantially isolated within the housing from strain imposed on the fibre outside the housing and such that substantially only changes in temperature affect the Bragg grating.

This provides a simple construction which is easily made, is compact and can easily be associated with a structure in an appropriate location at which a temperature measurement is to be made. The housing may be of any suitable material allowing compatibility with any particular application of the sensor or sensor array. The housing isolates the grating from strain imposed on the fibre outside the housing allowing more accurate sensing of temperature and allowing the apparatus to be set up easily without the need to ensure the fibre outside the housing is unstrained (except for avoiding breakage of the fibre).

An aspect of the invention can also provide a tool or other structure incorporating such an apparatus.

Although various aspects of the invention are set out in the accompanying independent and dependent claims, other aspects of the invention include any combination of features from the described embodiments and/or the accompanying dependent claims, possibly with the features of the independent claims, and not solely the combinations explicitly set out in the accompanying claims.

BRIEF DESCRIPTION OF THE DRAWINGS

Embodiments of the invention are described, by way of example only, with reference to the accompanying drawings.

Figure 1:
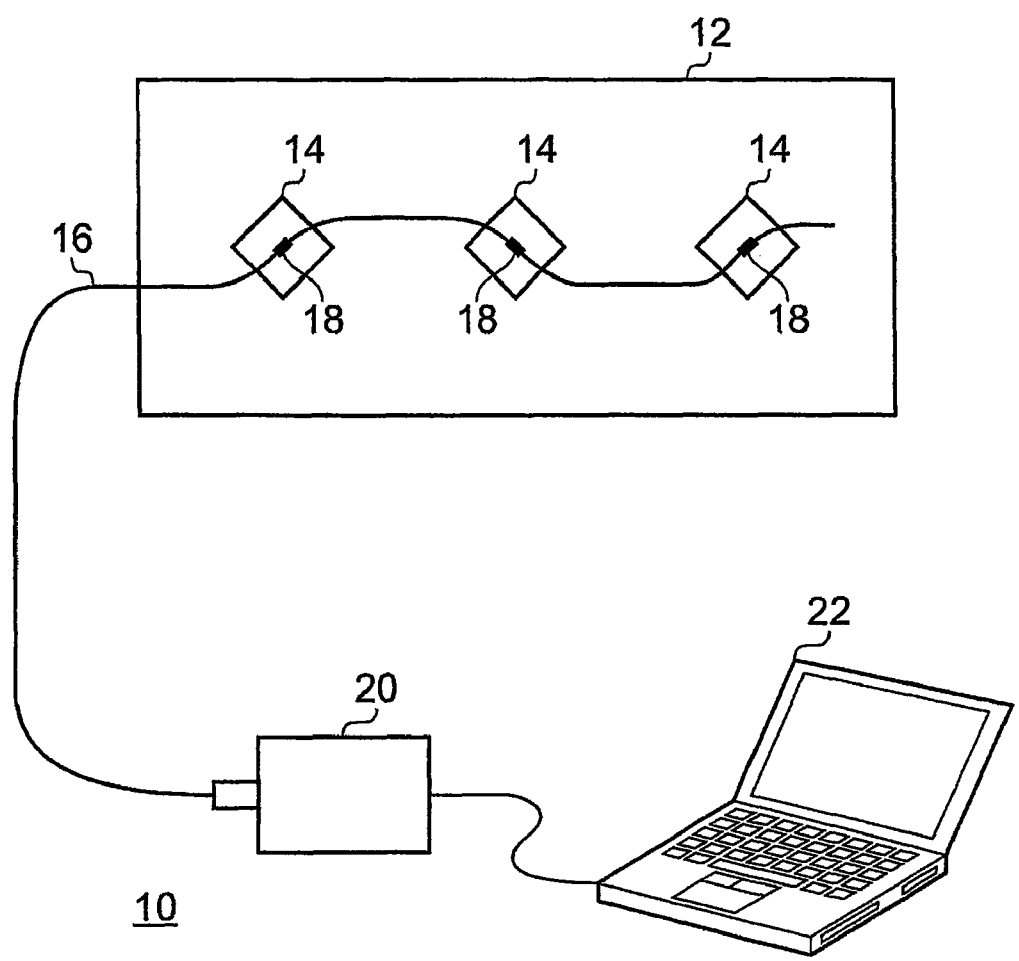
FIG. 1 is a schematic diagram of an array of Bragg gratings in accordance with the invention for sensing temperature arranged on a tool for forming a composite component.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention.

DETAILED DESCRIPTION

Embodiments of the invention will be described with reference to a tool for forming a component of composite material for example a laminated material made of pre-impregnated reinforcement fibre in a polymeric resin.

Each lamina of the laminated material can include plies of fibres. The fibres may be carbon fibres or Kevlar for example. The fibres of successive laminae may be differently oriented as known in the art. The process of forming the component requires the tool to be heated by one or more heaters which may be embedded in the tool. The temperature of the tool needs to be at least monitored and preferably controlled and for that purpose an array of temperature sensors is provided. In this example, the array comprises many sensors on a single optical fibre.

The tool can be of a material compatible with the composite material being formed. For example, in the described examples, the tool is of the same material as the composite.

The optical fibre can be made of any suitable material. In the described examples, the optical fibre is a glass or silica optical fibre, is of a similar diameter to the thickness of a cured ply in a typical carbon fibre composite, a typical thickness of which is 0.250 mm (250 microns). Although a glass optical fibre can be less stiff than a carbon fibre, it is compatible with the composite material and its processing. The optical fibre can be embedded in the composite material of the tool at a suitable depth from the surface thereof. In other examples the optical fibre can be made of other materials.

Referring to FIG. 1, a tool 12 for forming a composite component has embedded in it a plurality of housings 14 each containing a portion of the optical fibre 16. The housings 14 are incorporated in the tool 12 by embedding them below the surface of the tool. For example where the tool is made of laminae, it may be immediately below the top most lamina on the tool face.

Each portion of the fibre 16 within a housing 14 has a Bragg grating 18 thereon. The gratings 18 can be written on the fibre in known manner. A Bragg grating processor 20, for example a fibre sensor interrogator, is arranged to transmit laser radiation of a suitable wavelength along the fibre 16 to the gratings. The individual gratings can be addressed by the processor 20 using wavelength division multiplex (WDM) techniques or time division multiplex (TDM) techniques, both of which are well known in the art and so will not be further described here. Changes of temperature can be sensed by suitable processing of the signals returned to the processor 20 by the gratings 18 as known in the art. In the example of FIG. 1, a computer 22 can be arranged to run suitable analytical software to analyse temperatures sensed by the array. As described below with reference to FIG. 15 one or more heating elements may be controlled in dependence upon the sensed temperatures.

The housings 14, as will be described below, each house a section of the fibre 16 isolating the grating 18 within the housing 14 from strain imposed on the fibre outside the housing. The fibre 16 should be with as little axial strain within the housing 14 as possible, ideally without axial strain. Any strain within the housing 14 is a constant reference level from which strain induced by temperature change is sensed. Each portion of optical fibre 16 in a housing 14 is formed to include at least one arcuate or curved portion. This means that the fibre 16 adopts a longer path between an entry point to the housing 14 and an exit point from the housing 14 and therefore can be substantially isolated from strain. It should be noted that where reference is made herein to an entry or an entry point, and to an exit or exit point, this is not indicative of motion or ordering of the entry and exit, but this terminology is merely used to label respective ports or openings of a strain isolating housing through which an optical fibre extends. The portions of optical fibre 16 between the housings 14 are embedded in the material of the tool. The portions of fibre 16 between the housings 14 may be subject to strain but the housings 14 isolate the gratings 18 within the housings 14 from that strain so the gratings 18 can accurately sense temperature alone.

Figure 2:
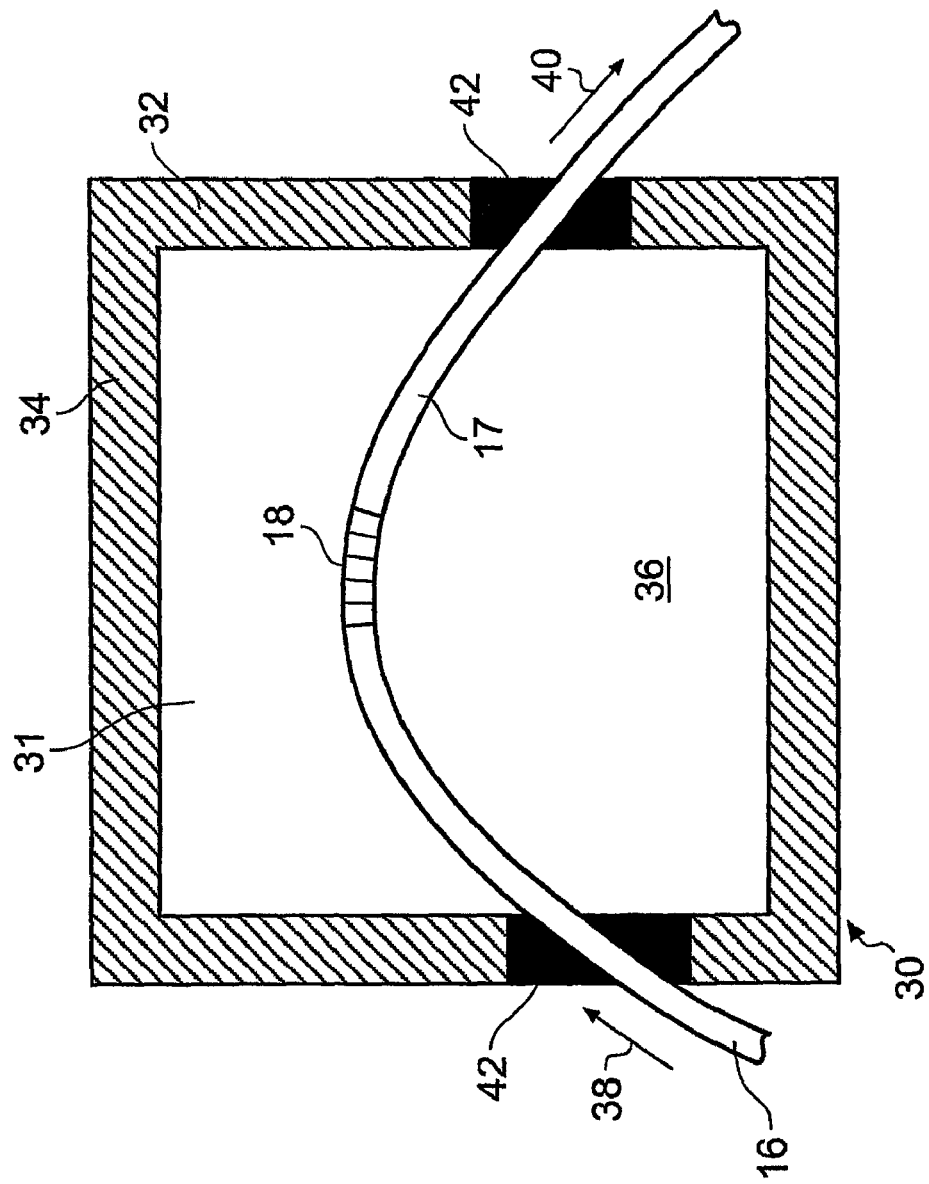
FIG. 2 is a schematic horizontal cross-sectional view of an example of a strain-isolating housing with a portion of optical fibre having a Bragg grating.
Figure 3:
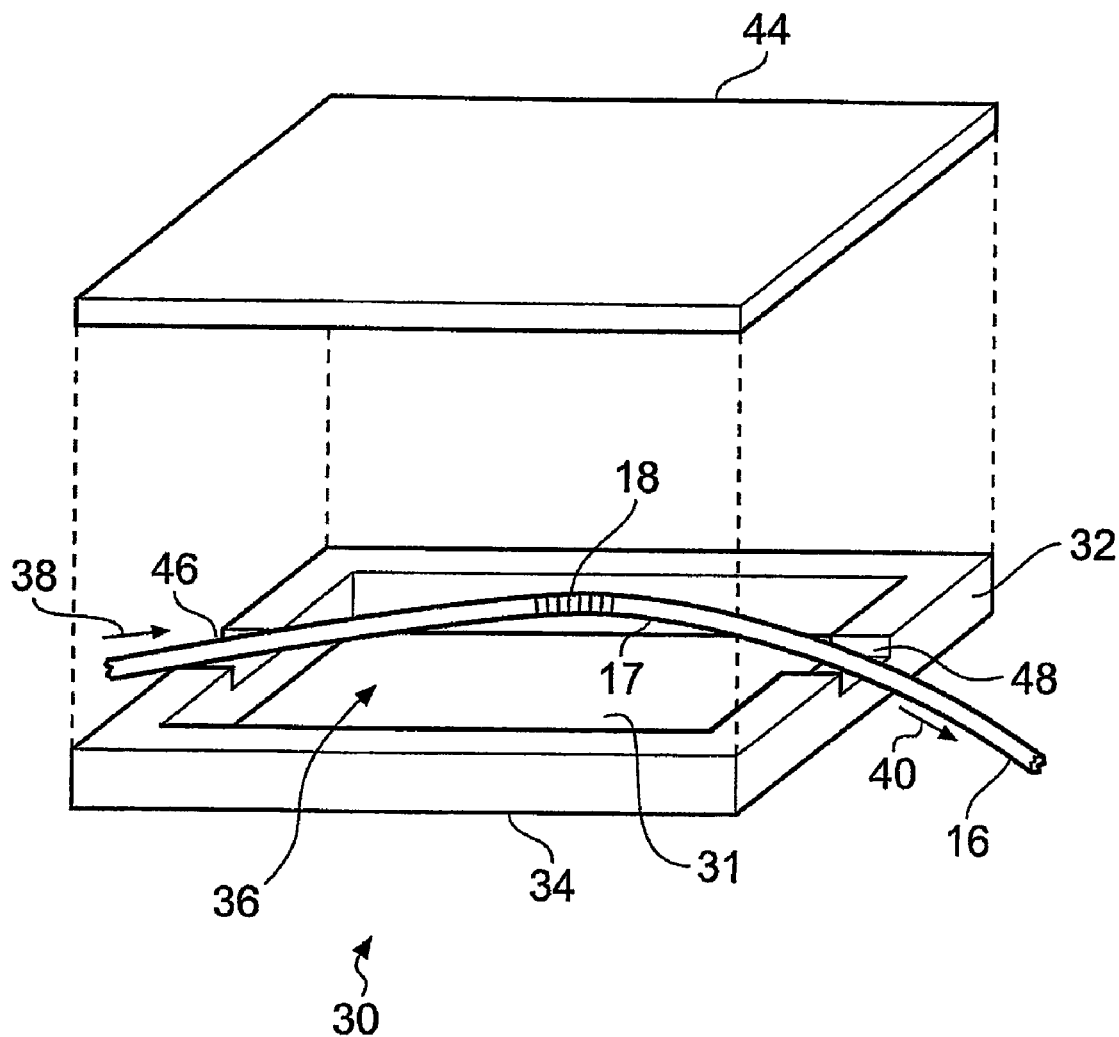
FIG. 3 is a schematic exploded perspective view of the example of a strain-isolating housing of FIG. 2.
Figure 4:
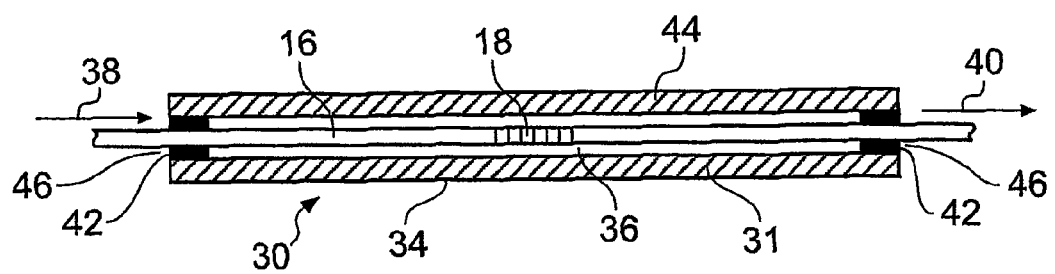
FIG. 4 is a schematic vertical cross-sectional view of the strain-isolating housing of FIG. 2.

FIG. 2 is a schematic horizontal cross section through an example of a strain isolating housing 30, corresponding to one of the strain isolating housings 14 illustrated in FIG. 1. FIG. 3 is a schematic exploded perspective view of the strain-isolating housing of FIG. 2. FIG. 4 is a vertical cross section through the housing 30 of FIG. 2 following the path of the optical fibre 16. It should be understood that references to horizontal and vertical herein are used to identify relative rather than absolute directions, and that the absolute directions will depend on the orientation of the housing.

As shown in FIGS. 3 and 4, the strain isolating housing includes a base portion 34 and a cover 44. In the example shown in FIGS. 2, 3 and 4, the strain isolating housing 30 has a tile-like substantially rectangular shape. In one example, which is intended for use in a composite tool, the external dimensions of the housing could be about 25 mm×20 mm×3 mm (length×width×height). Other sizes of housing can be used according to a particular application. The base portion 34 has a bottom wall 31 and a peripheral wall 32 to define a cavity 36 within the base portion and the cover 44 is a substantially planar element that covers the cavity 36. Recessed portions 46 and 48 are provided in the peripheral wall 32 at two spaced apart locations (in the present example at substantially opposite locations 46 and 48) to form an entry 38 to the housing 30 and an exit 40 from the housing 30 for the optical fibre. The optical fibre 16 extends through the recessed portions of the peripheral wall 46 and 48 and is fixed, or sealed in position at the entry 38 to and at the exit 40 from the housing 30 using resin 42 to plug and seal the recessed portions of the peripheral wall 32. The resin used can be any suitable resin that can withstand the temperature to which the tool is heated. An example of a suitable resin to join the base portion 34 to the cover 44 could be "Duralco 4525-1 high temperature resin". This same resin can also be used to plug and seal the holes in the wall of the housing. A different epoxy resin can be used to bind the carbon fibres in the composite that makes up the composite tool in which the sensors would be embedded.

In this example, the optical fibre 16 extends freely through the cavity 36, supported at the entry 38 to and the exit 40 from the housing 30 by the resin in the recessed portions 46 and 48 of the peripheral wall 32. The optical fibre 16 is mounted within the housing 30 by the resin 42 in the recessed portions with a length of optical fibre 16 greater than the direct distance between the entry 38 to and the exit 40 from the housing 30, such that the optical fibre displays at least one arcuate portion 17. In this example the Bragg grating 18 is formed part way along the arcuate portion 17 within the housing 30. The presence of at least one arcuate portion 17 is a result of the path adopted by the fibre being greater than the direct path between the entry 38 to and the exit 40 from housing 30. For example, assuming a 25 mm direct path length, a length of 25.6 mm of optical fibre in the housing would give 45 degree arc angle of the fibre over an arc radius of 33 mm.

The arc subtended by and the radius of curvature of the optical fibre 16 are chosen to enable the fibre within the housing substantially to be isolated from strain, while meeting the optical parameters of the fibre and keeping the dimensions of the housing as small as possible. For example the arc is chosen to be a gentle arc and to be substantially less than a full loop of the fibre, that is substantially less than for the path adopted by the optical fibre to intersect itself. The arc subtended can, be, for example, in the range of, for example, 10 to 90 degrees, advantageously 30 to 60 degrees. In one example mentioned above, the arc can be of the order of 45 degrees with a radius of curvature of 33 mm.

This means that the optical fibre within the housing can be substantially isolated from strain external to the housing by adopting such a gentle curve that does not take much space and lies well within the curvature permitted for the optical fibre to avoid damage thereto and to ensure good operation of the Bragg grating 18. The Bragg grating 18 can be located, for example, in the portion of the optical fibre within the housing that adopts the arcuate shape.

Figure 7:
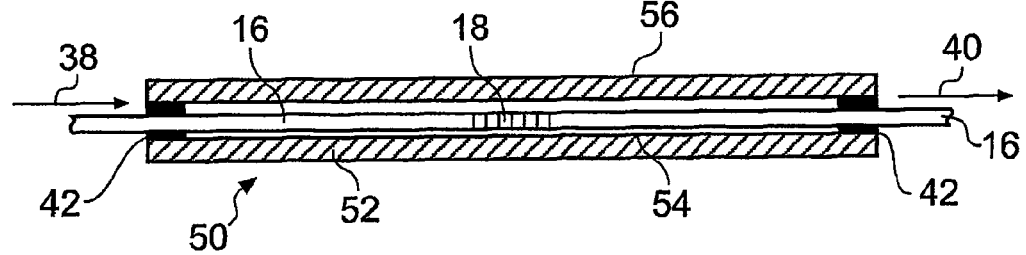
FIG. 7 is a schematic vertical cross-sectional view of the strain-isolating housing of FIG. 4.
Figure 5:
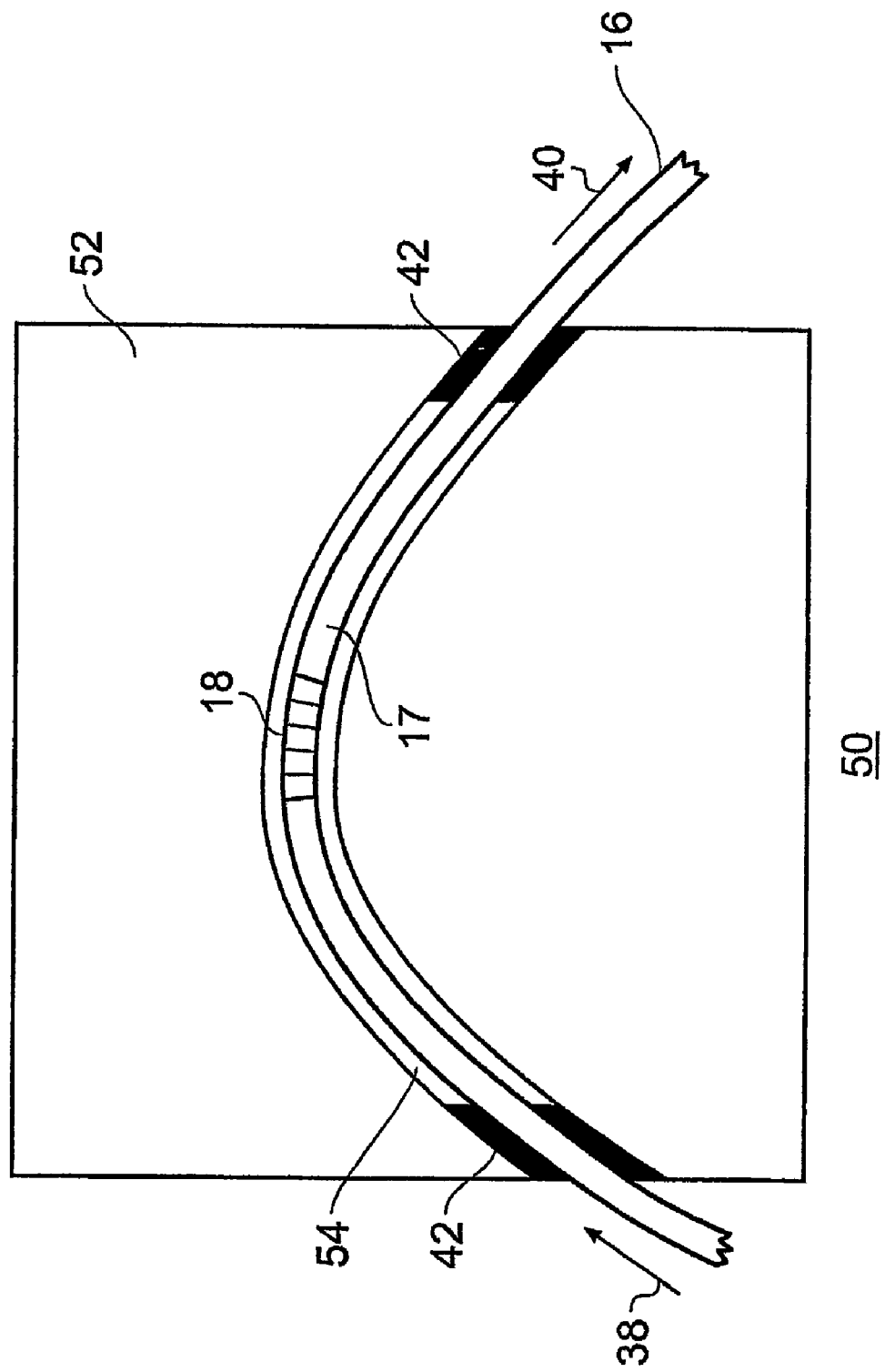
FIG. 5 is a schematic horizontal cross-sectional view of another example of a strain-isolating housing with a portion of optical fibre having a Bragg grating.
Figure 6:
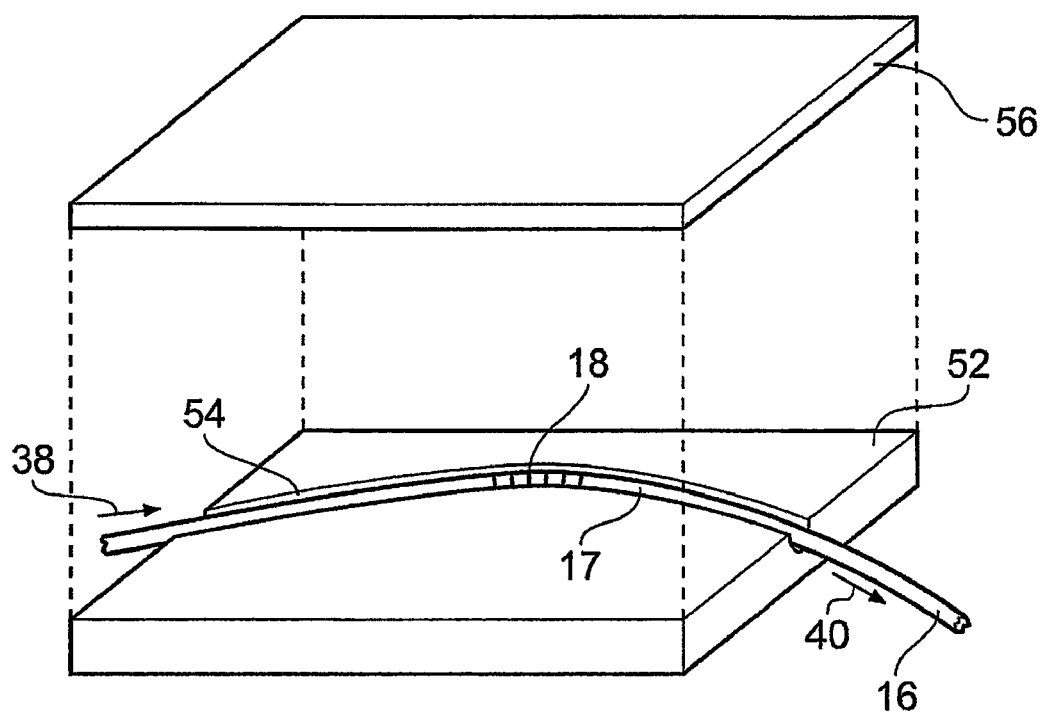
FIG. 6 is a schematic perspective view of the example strain-isolating housing of FIG. 5.

FIG. 5 is a schematic horizontal cross section through another example of a strain isolating housing 50, corresponding to one of the strain isolating housings 14 illustrated in FIG. 1. FIG. 6 is a schematic exploded perspective view of the strain-isolating housing of FIG. 5. FIG. 7 is a vertical cross section through the housing 50 of FIG. 5 following the path of the optical fibre 16. As shown in FIGS. 6 and 7, the strain isolating housing includes a base portion 52 and a cover 56. In the example shown in FIGS. 5, 6 and 7, the strain isolating housing 50 has a tile-like substantially rectangular shape. The base portion 52 is formed with a channel 54, which forms a cavity that follows an arcuate path for receiving the optical fibre 16. In this example the channel 54 has a cross section larger than the cross section of the fibre so that the fibre can be fully and freely received within the channel 54, and such that is it not frictionally constrained by the channel 54. The optical fibre 16 extends through the channel 54 from the entry 38 to the housing 50 to the exit 40 from the housing 50. In this example, the optical fibre 16 is held within the channel in the region of the entry 38 to the housing 50 and in the region of the exit 40 from the housing 50 using resin 42 to fill the recessed portions of the peripheral wall 32. As with the example illustrated in FIGS. 2 and 3, the resin used can be any suitable resin that can withstand the temperature to which the tool is heated as described earlier.

In this example, the optical fibre 16 extends freely through the channel 54, supported in the region of the entry 38 to and the exit 40 from the housing 50 by the resin 42. The optical fibre 16 is effectively mounted within the housing 50 by the resin 42 with a length of optical fibre 16 following the channel 54 being greater than the direct distance between the entry 38 to and the exit 40 from the housing 30 were the channel to follow that direct path. The optical fibre 16 therefore displays at least one arcuate portion 17. In this example the Bragg grating 18 is formed part way along the arcuate portion 17 within the channel 54 in the housing 50. The presence of at least one arcuate portion 17 is a result of the path adopted by the fibre and that of the channel 54 being greater than a direct distance between the entry point 38 to and the exit point 40 from housing 30.

The path of the channel 54 is chosen such that the arc subtended by and the radius of curvature of the optical fibre 16 is are chosen to enable the fibre 16 within the housing substantially to be isolated from strain, while meeting the optical parameters of the fibre and keeping the dimensions of the housing as small as possible as described with reference to FIGS. 2-4.

Figure 8:
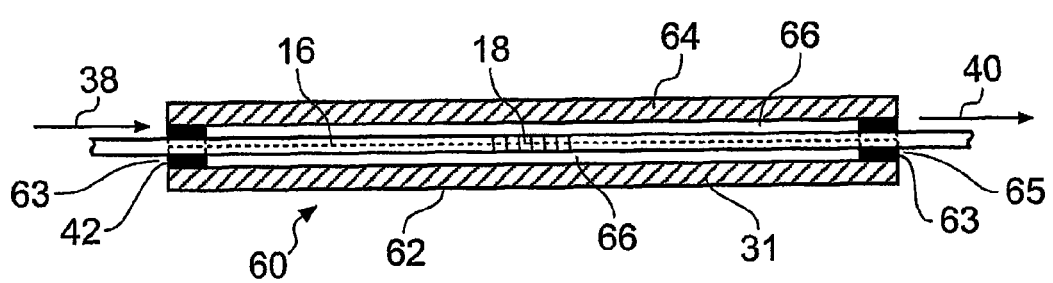
FIG. 8 is a schematic vertical cross-sectional view of an alternative construction for the strain-isolating housing of FIG. 2.

Returning to the example of FIG. 2-4, FIG. 8 represents a vertical cross section through an alternative housing 60 that is similar to the housing 30 but has a somewhat different construction to that shown in FIG. 4. Rather than the housing 30 that has a base portion 34 with a cavity 36 that completely receives the optical fibre 16 and a substantially flat cover 44, in the example housing 60 of FIG. 8 both the base portion 62 and the cover portion 64 are shaped to form part of a cavity 66 for receiving the optical fibre 16. As shown in FIG. 8, the base portion 62 has a peripheral wall 63 to define a part of the cavity 66 and the cover portion 64 has a peripheral wall 65 to define a further part of the cavity 66. The peripheral walls 63 and 65 are formed with recessed portions at an entry 38 to and at an exit 40 from the housing 60. The optical fibre 16 is received partly by each of the recessed portions at the entry 38 and exit 40 in the peripheral walls 63 and 65 wall of the base 62 and cover 64 and is sealed therein using, for example, a resin 42 to plug and seal the recessed portions as described with respect to FIGS. 2 to 4. The resin can also be used to join the base portion 62 to the cover 64.

In this example, as the example of FIGS. 2-4, the optical fibre 16 extends freely through the cavity 66, supported at the entry 38 to and the exit 40 from the housing 30 by the resin 42 in the recessed portions of the peripheral walls 63 and 65. Also, as with the example of FIGS. 2-4, the optical fibre 16 is mounted within the housing 60 by the resin 42 in the recessed portions with a length of optical fibre 16 greater than the direct distance between the entry 38 to and the exit 40 from the housing 60 such that the optical fibre displays at least one arcuate portion as described with reference to FIGS. 2-4, including the Bragg grating 18 formed part way along the arcuate portion of the optical fibre 16.

Figure 9:
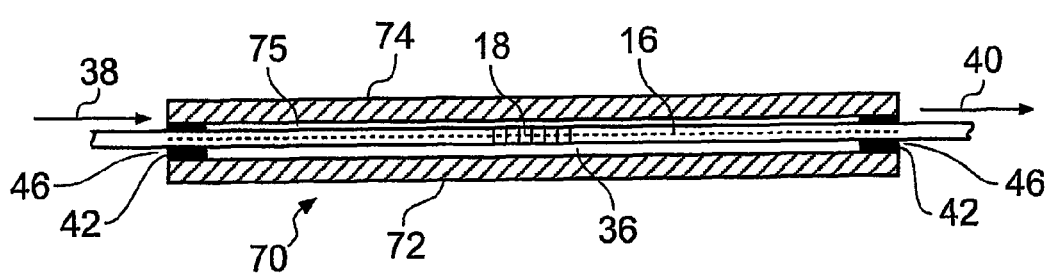
FIG. 9 is a schematic vertical cross-sectional view of a further alternative construction for the strain-isolating housing of FIG. 2.

FIG. 9 represents a vertical cross section through a further alternative housing 70 that is similar to the housing 60 but has a somewhat different construction to that shown in FIG. 8. The base 72 of the housing 70 has a peripheral wall 73 to define a cavity 66 that partially receives the optical fibre. The cover 74 of the housing 70 is substantially flat (i.e. it does not have a peripheral wall), but instead it is formed with a channel 75 that partially receives the optical fibre 16. The channel 75 is formed in the cover to follow the arcuate path for receiving the optical fibre 16. In this example the channel 54 has a width larger than the diameter of the fibre 16 so that the fibre can be partially and freely received within the channel 75 such that is it not frictionally constrained by the channel 75. The optical fibre 16 extends through the channel 75 from the entry 38 to the housing 70 to the exit 40 from the housing 70. In this example, the optical fibre is fixed within the housing in the region of the entry 38 to the housing 70 and in the region of the exit 40 from the housing 50 using resin 42 as described earlier. As with the examples described earlier, the resin used can be any suitable resin that can withstand the temperature to which the tool is heated. For example, "Duralco 4525-1 high temperature resin" could be used to join the base portion 34 to the cover 44 and to plug and seal the holes in the wall of the housing. The path of the channel 75 is chosen such that the arc subtended by and the radius of curvature of the optical fibre 16 is are chosen to enable the fibre 16 within the housing 70 substantially to be isolated from strain, while meeting the optical parameters of the fibre and keeping the dimensions of the housing as small as possible as described with reference to FIGS. 2-4. A Bragg grating 18 is formed part way along an arcuate portion of the optical fibre 16.

Figure 10:
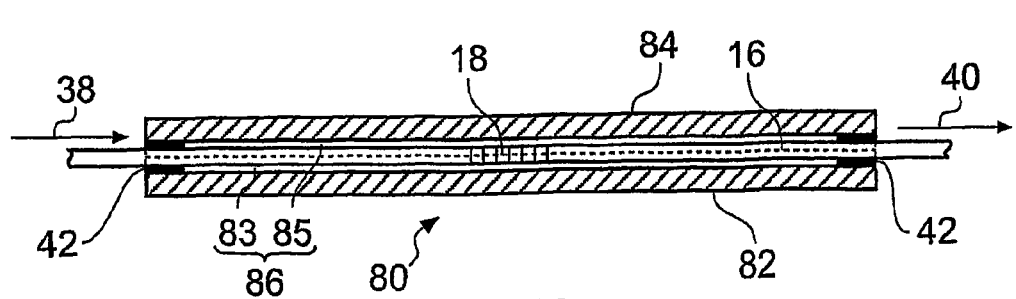
FIG. 10 is a schematic vertical cross-sectional view of an alternative construction for the strain-isolating housing of FIG. 4.

FIG. 10 represents a vertical cross section through a further alternative housing 80 that is similar to the housing 50 described with reference to FIGS. 5-7 but has a somewhat different construction to that shown in FIG. 7. In this case, the base portion 82 is formed with a channel 83 and the cover portion 84 is formed with a channel 85. The channels 83 and 85 are arranged such that when cover portion 84 is joined to the base portion 82, the channels 83 and 85 combine to form a channel 86, which forms a cavity that follows an arcuate path for receiving the optical fibre 16. In this example the channel 86 has a cross section larger than the cross section of the fibre so that the fibre can be fully and freely received within the channel 86, and such that is it not frictionally constrained by the channel 86. The optical fibre 16 extends through the channel 86 from the entry 38 to the housing 80 to the exit 48 from the housing 80. In this example, the optical fibre is held within the channel in the region of the entry 38 to the housing 80 and in the region of the exit 40 from the housing 80 using resin 42 to fill the channel 86. As with the other examples described earlier, the resin used can be any suitable resin that can withstand the temperature to which the tool is heated. The path of the channel 86 is chosen such that the arc subtended by and the radius of curvature of the optical fibre 16 is are chosen to enable the fibre 16 within the housing substantially to be isolated from strain, while meeting the optical parameters of the fibre and keeping the dimensions of the housing as small as possible as described with reference to FIGS. 2-4. A Bragg grating 18 formed part way along an arcuate portion of the optical fibre 16.

In all of the examples described above, it is assumed that the positioning of the optical fibre 16 is substantially as described with reference to FIGS. 2-4 and has a single curve. However, many other possibilities exist.

Figure 11:
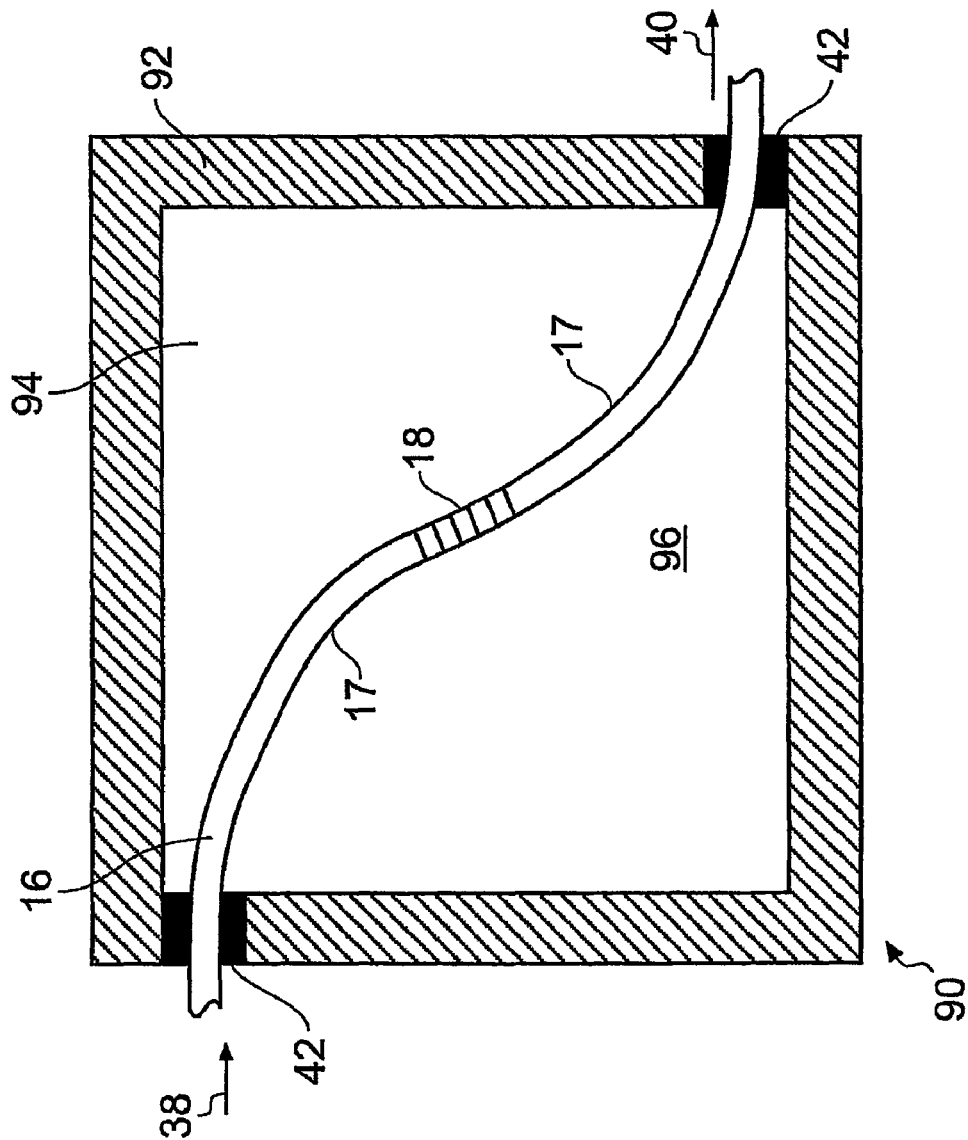
FIG. 11 is a schematic horizontal cross-sectional view of a further example of a strain-isolating housing with a portion of optical fibre having a Bragg grating.

FIG. 11 illustrates one possible alternative arrangement based on a housing 90 similar to that of FIGS. 2-4. However, as shown in FIG. 11, the housing 90 has an entry 38 and an exit 40 at substantially at diagonally opposite positions of a peripheral wall 92. In this example, a length of the optical fibre 16 greater than the distance between the entry 38 and the exit 40 is held within the cavity 96 within the peripheral wall 92 of the base portion 94 of the housing 90 by means of resin 42 that plugs recessed portions of the peripheral wall at the entry 38 and exit 40. In this example the additional length of the fibre is such that it adopts an "S" or serpentine shape with in this case two opposing arc shapes. A Bragg grating 18 is provided within the serpentine section, and may between arcuate portions or on an arcute portion of the fibre 16. As with the earlier examples, the housing 90 and the optical fibre 16 are arranged such that the arcs subtended by and the radii of curvature of the optical fibre 16 are chosen to enable the fibre 16 within the housing substantially to be isolated from strain, while meeting the optical parameters of the fibre and keeping the dimensions of the housing as small as possible as described with reference to FIGS. 2-4.

In the above examples the housings 14 have substantially square or rectangular shapes. However, in other examples other shapes may be used.

Figure 12:
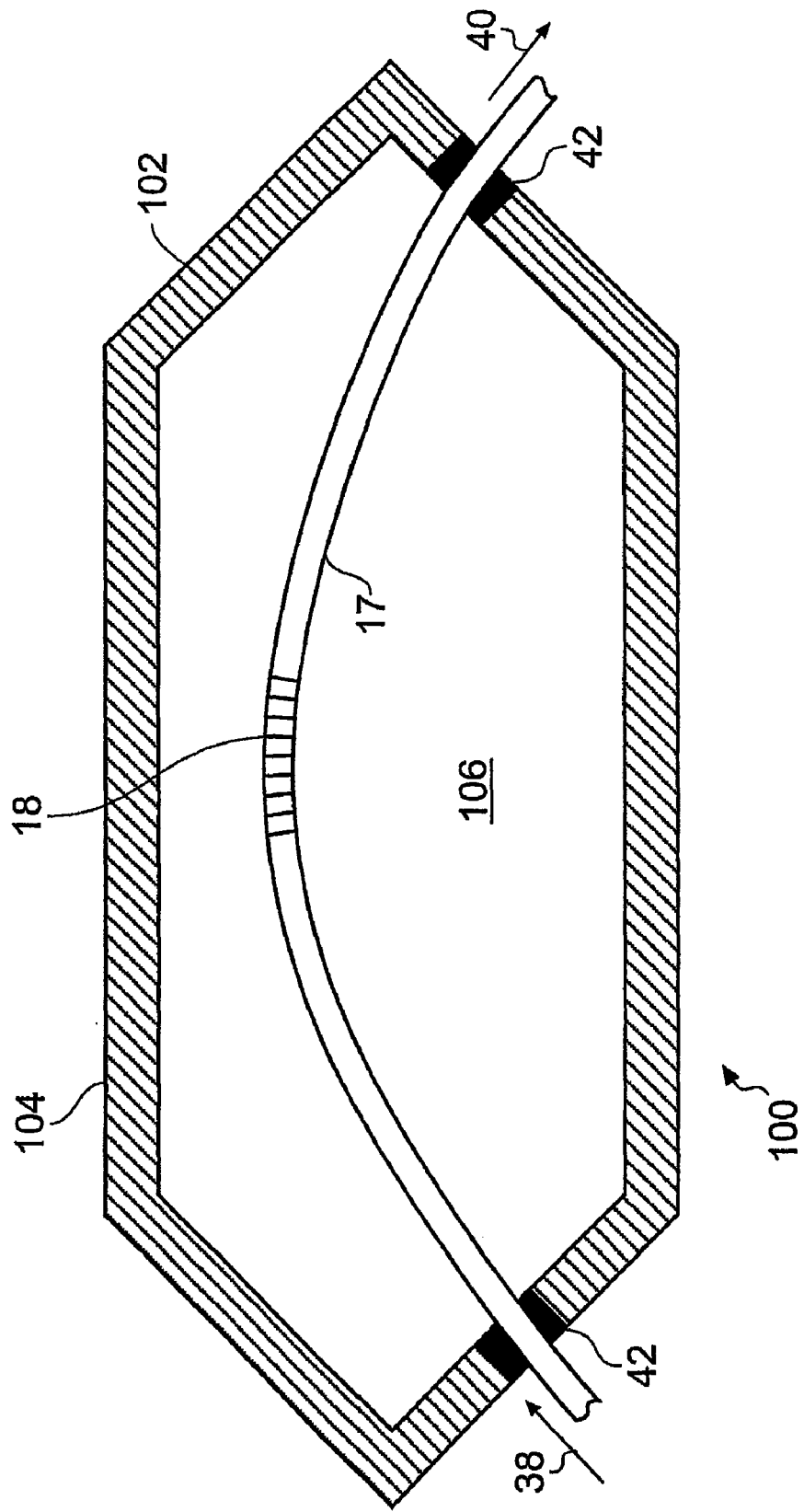
FIG. 12 is a schematic horizontal cross-sectional view of another example of a strain-isolating housing with a portion of optical fibre having a Bragg grating.

For example, FIG. 12 illustrates a lozenge shaped housing 100, which is otherwise similar to the example housing shown in respect of FIGS. 2-4. The housing 100 has an entry 38 and an exit 40 in a peripheral wall 102 at substantially at opposite ends of the base portion 104 of the housing 100. A length of the optical fibre 16 greater than the distance between the entry 38 and the exit 40 is held within a cavity 106 within the peripheral wall 102 of the base portion 104 of the housing 100 by means of resin 42 that plugs recessed portions of the peripheral wall at the entry 38 and exit 40. In this example the additional length of the fibre is such that it adopts an arcuate, or "C" shape. A Bragg grating 18 is located within the arcuate portion in this example. As with the earlier examples, the housing 100 and the optical fibre 16 are arranged such that the arcs subtended by and the radii of curvature of the optical fibre 16 are chosen to enable the fibre 16 within the housing substantially to be isolated from strain, while meeting the optical parameters of the fibre and keeping the dimensions of the housing as small as possible as described with reference to FIGS. 2-4.

Figure 13:
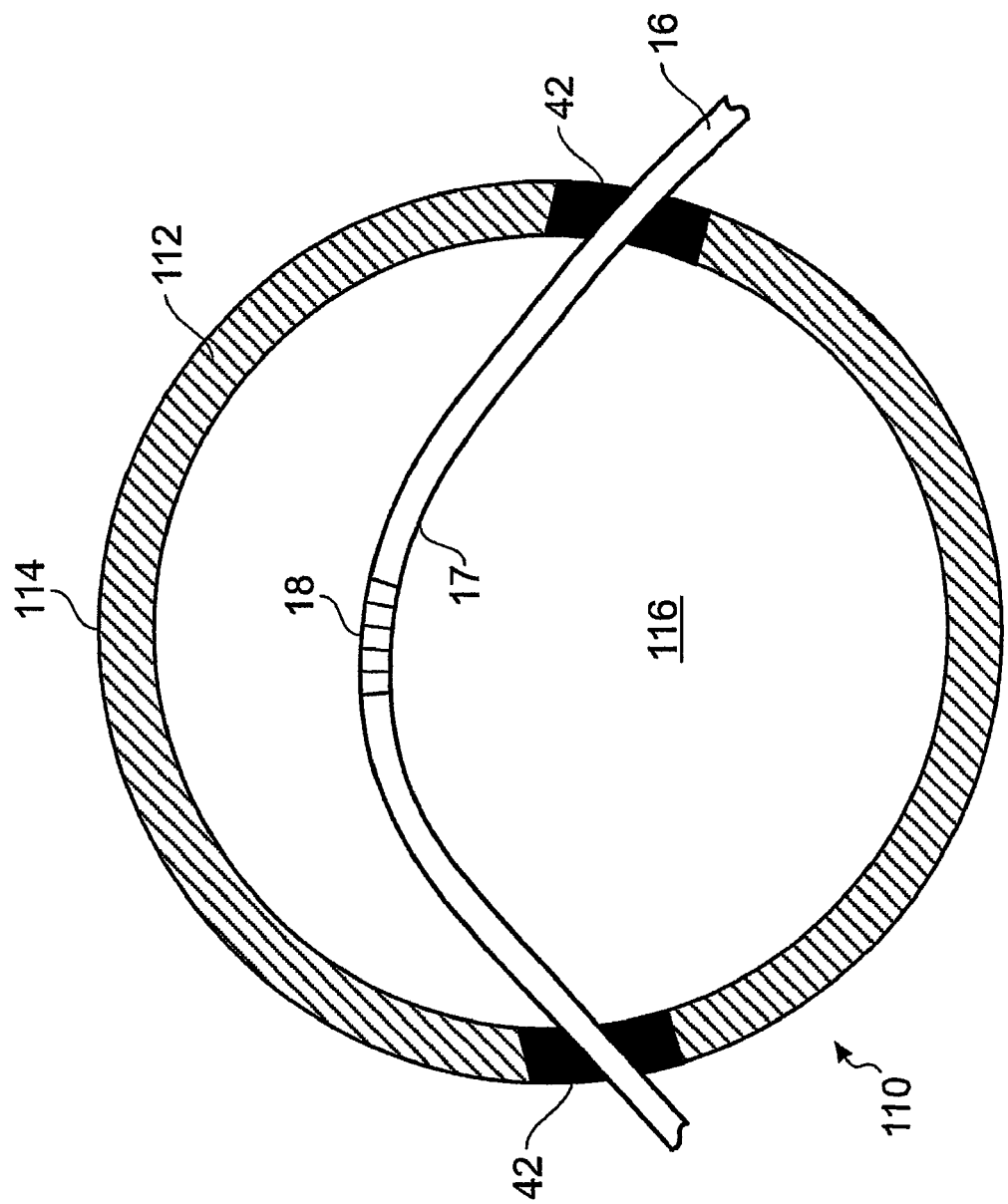
FIG. 13 is a schematic horizontal cross-sectional view of a further example of a strain-isolating housing with a portion of optical fibre having a Bragg grating.

FIG. 13 illustrates a circular housing 110, which is otherwise similar to the example housing shown in respect of FIGS. 2-4. The housing 110 has an entry 38 and an exit 40 substantially opposite each other in a peripheral wall 112 of the base portion 114 of the housing 110. A length of the optical fibre 16 greater than the distance between the entry 38 and the exit 40 is held within a cavity 116 within the peripheral wall 112 of the base portion 114 of the housing 110 by means of resin 42 that plugs recessed portions of the peripheral wall at the entry 38 and exit 40. In this example the additional length of the fibre is such that it adopts an arcuate, or "C" shape. A Bragg grating 18 is located within the arcuate portion in this example. As with the earlier examples, the housing 110 and the optical fibre 16 are arranged such that the arcs subtended by and the radii of curvature of the optical fibre 16 are chosen to enable the fibre 16 within the housing substantially to be isolated from strain, while meeting the optical parameters of the fibre and keeping the dimensions of the housing as small as possible as described with reference to FIGS. 2-4.

Figure 14:
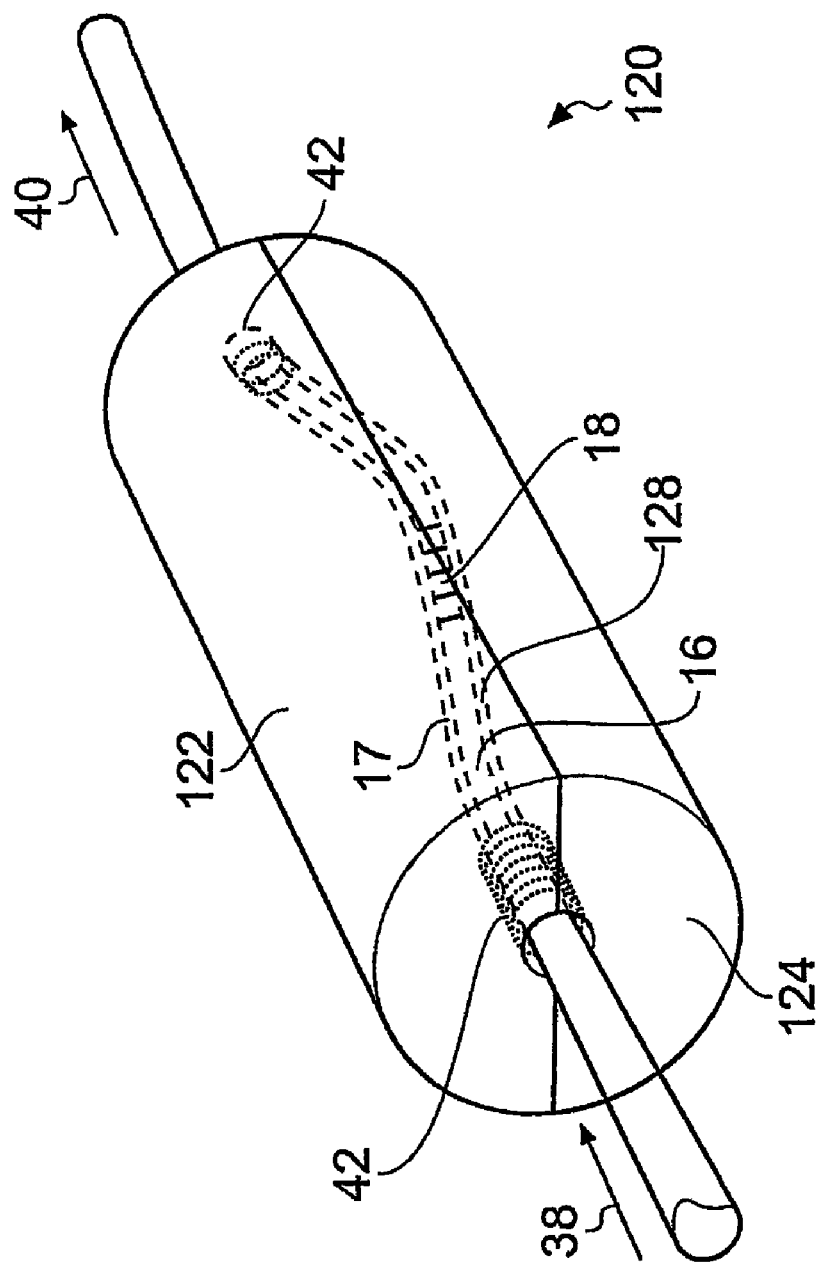
FIG. 14 is a schematic perspective view of another example of a strain-isolating housing with a portion of optical fibre having a Bragg grating.

In the examples described above, the housings have flat upper and lower surfaces. However, other examples of housing could have other external shapes. For example, FIG. 14 illustrates an example of a housing 120 with a substantially cylindrical shape. This example is formed from an upper housing portion 122 and a lower housing portion 124. An entry 38 to a channel 128 is at one end of the housing 120 and an exit from the channel 128 is at the other end of the housing 120. The channel 128 follows a curved path longer than a direct distance between the entry 38 and the exit 40 and is formed partly in each of the two portions 122 and 124 of the housing 124. An optical fibre 16 is received within the channel 128 and is sealed within the channel 128 in the region of the entry 38 to and the exit 40 from the housing 120. In this example a Bragg grating 18 is formed part way along an arcuate portion of the optical fibre 16. As with the earlier examples, the housing 120 and the optical fibre 16 are arranged such that the arcs subtended by and the radii of curvature of the optical fibre 16 are chosen to enable the fibre 16 within the housing substantially to be isolated from strain, while meeting the optical parameters of the fibre and keeping the dimensions of the housing as small as possible as described with reference to FIGS. 2-4.

It will be appreciated that various examples of housings have been selected to illustrate examples of shapes and constructions for the strain isolating housings. It should be noted that these examples are illustrative only, and that aspects of the various examples may be combined in any appropriate combination. For example, the shape of the housing could take any of the examples shown and/or other examples of housings having combinations of rectilinear and/or curved walls (e.g., semi-circular, polygonal, etc.) and the housings could be configured as described with reference to one or more of FIG. 4, 7, 8, 9 or 10 and 14.

Figure 15:
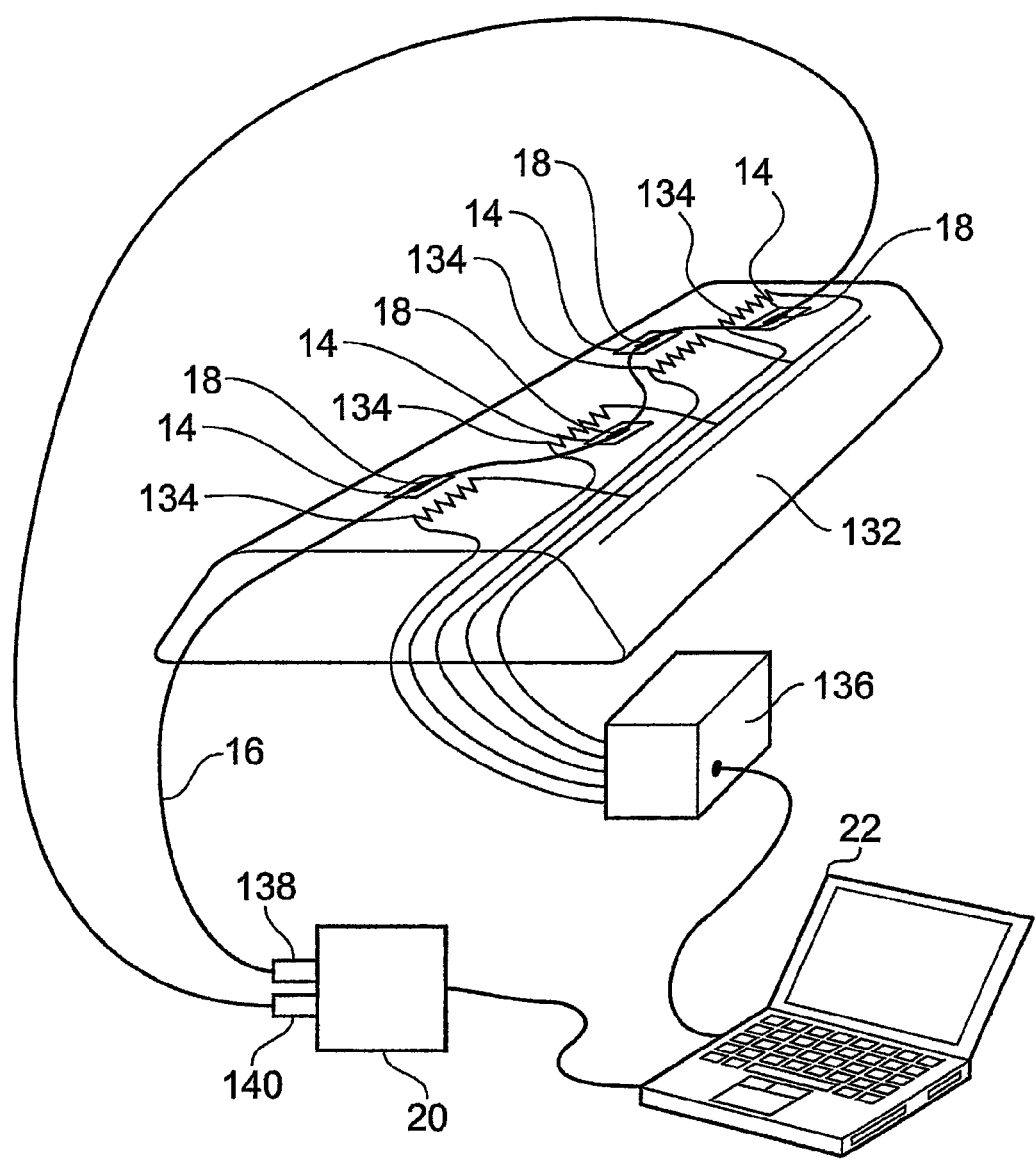
FIG. 15 is a schematic diagram of a tool for forming a composite component, the tool including heating elements and an array of Bragg gratings in accordance with the invention.

FIG. 15 illustrates an example application of such strain isolating housings to form temperature sensors for a tool 132 for forming a component of composite material. The example tool 132 has embedded within it a plurality of electrical heaters 134, for example resistive heating elements. Each heater 134 heats a zone of the tool. As illustrated in FIG. 15, each zone can contain a housing 14 containing an arcuate portion of optical fibre 16 including a Bragg grating 18 as described, by way of example, with reference to the FIGS. 2-14. In the example illustrated in FIG. 15, both ends of the optical fibre 16 are connected to a fibre sensor interrogator 20. The advantage of having both ends of the fibre 16 connected to the fibre sensor interrogator is that the Bragg gratings 18 can still be accessed even if the fibre becomes damaged part way along its length. The fibre sensor interrogator 20 addresses the Bragg gratings 18 using TDM or WDM techniques to determine the temperatures sensed by those gratings 18. The computer 22 processes the temperature signals from the gratings 18 and then in this example provides temperature data to a heater controller 136 which controls the individual heaters 134 in dependence upon the temperatures sensed by the corresponding gratings 18 in their respective housings 14 to control the temperature of each region of the tool 132.

In an example embodiment, the optical fibre 16 and the housings 14 may be placed on or in the tool at any suitable location; for example in a desired relationship to the heating elements 134. The optical fibres 16 and housings 14 may be embedded in the material of the tool as described in the above examples, or, for example, where the tool is hollow, the optical fibre and/or the housings may be fixed to the inside surface of the tool.

An optical fibre sensor array as described with reference to FIGS. 1 and 15 can allow simple monitoring and/or control of temperature over the whole of the tool. There can be a plurality of gratings on an optical fibre. For example, there can be up to one hundred or more gratings and respective housings. Also, more than one fibre with gratings thereon inside respective housings may be provided on a tool, and there may be more than one fibre sensor interrogator 2. Also, there may be one or more heater controllers.

The fibre 16 (or fibres) and the housings 14 containing the Bragg gratings 18, are not usually damaged by the process of forming a component and removing the component from the tool. As a result, the optical fibres and housings can be removed from the tool and can be reused in a new tool reducing wastage of time and materials and reducing production costs.

The temperature sensors (formed by the gratings in their housings) on an optical fibre are calibrated before a first use. However, after calibration, they do not normally need to be recalibrated for successive component forming procedures, subject to quality control standards applicable to the components being formed. Accordingly, in some applications of such a tool, for example the manufacture of non-critical components, the gratings do not need to be recalibrated after each use. However, in some cases where critical components may have associated quality control standards, the sensors can be recalibrated. Accordingly, in some applications of the tool, for example the manufacture of critical aircraft components, quality control and/or regulatory authorities may require recalibration.

In the examples described above a tool is formed of composite material and the optical fibre may be embedded in the composite material of the tool. The housings may also be embedded in the composite. However, in other examples the tool may be of another material or materials. In one example, the tool may be of moulded material, for example plastic, and the fibre and housings may be embedded in the material during the moulding process.

The housings described above may be of composite material or other material compatible with the tool. In other examples the housing may be of other materials, for example metal, provided the housing houses the fibre and the Bragg grating within the housing in a substantially free manner substantially to isolate the fibre within the housing from strain imposed on the fibre outside the housing, whereby substantially only changes in temperature affect the Bragg grating.

The examples of applications described above relate to sensing temperatures of moulding tools. However other applications for an optical fibre having thereon Bragg gratings housed in housings as described above may be used to sense temperature in structures other than moulding tools. Examples of such structures include: vehicles including spacecraft, aircraft, ships, and automobiles; pipelines; industrial plant for example chemical plants; buildings, tunnels, roads, bridges, railways and other civil engineering structures.

The invention may be used for medical or veterinary purpose for example monitoring temperature of a person or animal.

Figure 16:
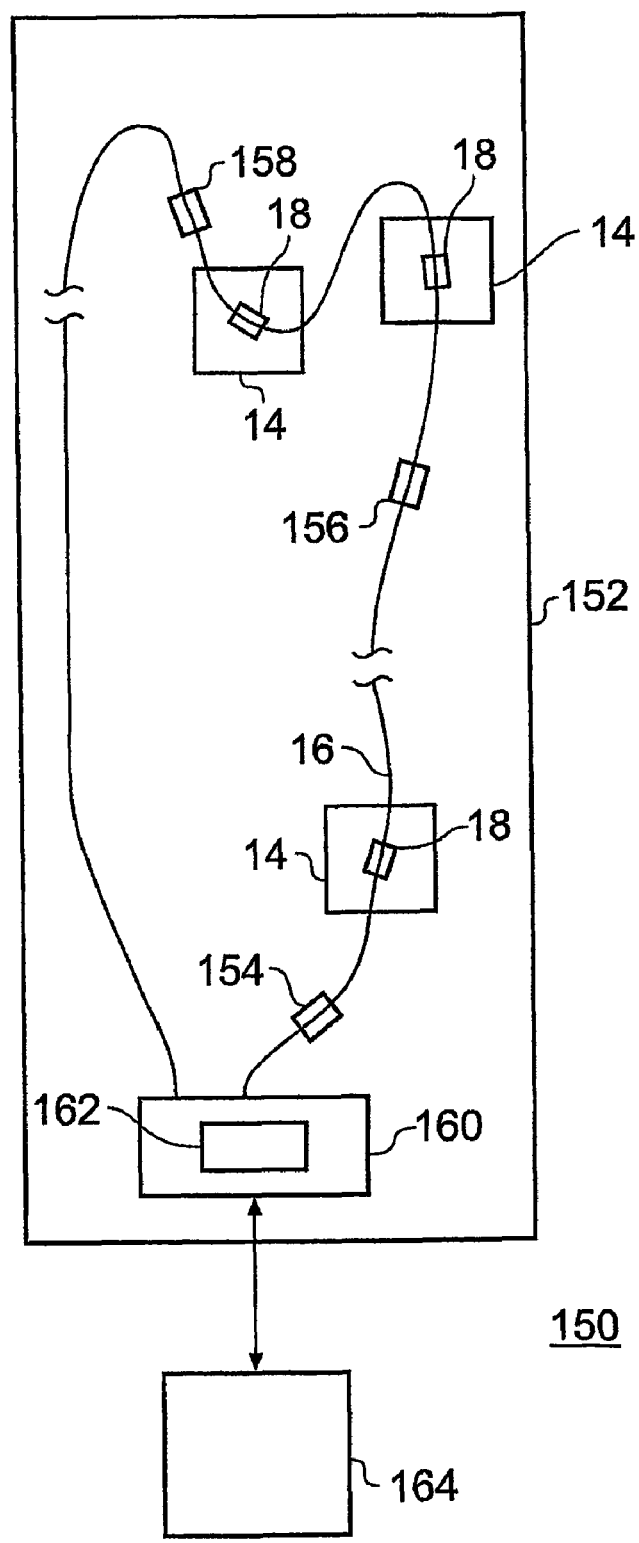
FIG. 16 is a schematic diagram of a structure including an array of Bragg gratings in accordance with the invention.

FIG. 16, illustrates an example comprises an apparatus 152 having an optical fibre 16 on which there are a plurality of Bragg gratings 18 in housings 14, each of which substantially freely houses the fibre 16 and a Bragg grating 18 within the housing 14, isolating the fibre from strain imposed on the fibre 16 outside the housing 14, whereby substantially only changes in temperature affect the Bragg grating 18. The housings may be as described above. In addition to the temperature sensing Bragg gratings 18, the fibre 16 may also have at least one Bragg grating 154, 156 which is not in such a housing 14 and is operable to sense a variable other than temperature. For example, one or more gratings 154, 156 on the fibre 16 can be operable, together with a suitable signal processor 160, to sense strain and/or chemical species and/or another variable or property.

The apparatus 152 of FIG. 16 may be a structure examples of which include: vehicles including spacecraft, aircraft, ships, and automobiles; pipelines; industrial plant for example chemical plants; and buildings, tunnels, roads, bridges, railways and other civil engineering structures. The apparatus 152 may be used to sense temperature and chemical species.

If, for example, the apparatus of FIG. 16 is arranged on a structure 152 which is a tool as described above, the gratings 154, 156 may, for example, be used to sense cure quality during a composite material curing process carried out on the tool.

If, for example, the structure 152 is a civil engineering structure or a vehicle, the apparatus of FIG. 16 can, for example, be arranged can monitor the temperature and strain on the structure 152. If, for example, the structure 152 is an aircraft or other vehicle, it may be desirable to monitor variations in strain and temperature of parts of the structure of the vehicle to predict and/or monitor for the onset of fatigue of the structure. If the structure is a bridge for example, the apparatus can monitor the load on the bridge in addition to the temperature of for example a roadway on the bridge.

The apparatus may be used to monitor strain, temperature and chemical species. This may be useful in for example monitoring a cure cycle on a tool as described above, or in a chemical plant, or in a road tunnel to monitor the build up of pollutants amongst other examples.

As shown in FIG. 16, the optical fibre 16 is connected to a processor 160. The processor 160 comprises a Bragg grating processor, for example a fibre sensor interrogator, as described with reference to FIG. 1 or 15. It may additionally comprise a data recorder indicated at 162 which records the data sensed by the gratings 18, 154, and 156 for later analysis. The processor 160 may alternatively, or additionally, comprise a process controller for controlling a sensed variable, for example temperature. The processor 160 may comprise a data transmitter that communicates with a remote processor 164, which itself may comprise a data recorder and/or process controller.

Accordingly, there has been described a temperature sensor array that comprises an optical fibre on which a plurality of Bragg gratings are for Med on respective spaced apart portions of the fibre. By housing a portion of the optical fibre having a Bragg grating in a housing, which freely houses the portion so as substantially to isolate the grating from strain imposed on the fibre outside the housing, substantially only changes in temperature affect the Bragg grating of that portion. The array may be thus be used, for example, to detect and control the temperature of a tool for forming a composite component amongst other uses.

Although the embodiments above have been described in considerable detail, numerous variations and modifications will become apparent to those skilled in the art once the above disclosure is fully appreciated.

The invention claimed is:

1. An apparatus comprising an optical fibre and a strain isolating housing wherein the housing defines a cavity and defines an entry to the cavity and an exit from the cavity, the optical fibre being arranged to enter the housing at the entry and to exit the housing at the exit and being secured to the housing at a first securing location in the region of said entry and at a second securing location in the region of said exit, the optical fibre including a Bragg grating within the housing and extending between the entry and the exit along a non-intersecting path that has at least one unsecured arcuate portion such that the portion at which the Bragg grating is formed is substantially isolated within the housing from strain imposed on the fibre outside the housing and such that substantially only changes in temperature affect the Bragg grating and the apparatus further comprises a processor arranged to receive a signal influenced by the Bragg Grating on the optical fibre and to use a change in the signal as an indication of a change in temperature.

2. The apparatus of claim 1, wherein the Bragg grating is formed on said at least one arcuate portion.

3. The apparatus of claim 1, wherein the housing comprises a first part and a second part, the first and second part being joined at least at the periphery of the first and second parts, the entry and the exit being formed at first and second locations, respectively, of an intersection of the periphery of the first and second parts.

4. The apparatus of claim 3, wherein periphery of each of the first and second parts are rectilinear and the first and second locations are formed at different sides of the rectilinear periphery of the first and second parts.

5. The apparatus of claim 4, wherein the housing is rectangular.

6. The apparatus of claim 4, wherein the housing is tubular.

7. The apparatus of claim 3, wherein periphery of each of the first and second parts is curved and the first and second locations are formed substantially opposite each other on the periphery of the first and second parts.

8. The apparatus of claim 3, wherein the periphery of at least one of the first and second parts comprises a peripheral wall, the first and second parts being joined together at the peripheral wall.

9. The apparatus of claim 3, wherein the periphery of both of the first and second parts comprises a peripheral wall, the first and second parts being joined together at the peripheral walls of the first and second parts.

10. The apparatus of claim 8, wherein the first and second part form an open cavity with the optical fibre extending freely between the entry and the exit.

11. The apparatus of claim 1, wherein the first part comprises a first surface with a first channel that extends between the entry and the exit and follows a non-intersecting path within which the optical fibre is received.

12. The apparatus of claim 11, wherein the other of the second part has a second surface that is in contact with the first surface.

13. The apparatus of claim 12, wherein the second surface with a second channel that extends between the entry and the exit and follows the same path as the first channel.

14. The apparatus of claim 1, comprising a plurality of strain isolating housing, wherein the optical fibre has plurality of Bragg gratings on respective spaced apart portions of the fibre, each Bragg grating being located in a respective housing.

15. The apparatus of claim 1, wherein the fibre is a single mode fibre.

16. The apparatus of claim 1, wherein the processor is arranged to determine a temperature sensed by the or each Bragg grating.

17. The apparatus of claim 1, wherein the optical fibre has at least one further Bragg grating operable to sense a variable other than temperature.

18. The apparatus of claim 17, wherein the at least one further Bragg grating is operable to sense strain on the fibre.

19. The apparatus of claim 17, wherein the at least one further Bragg grating is operable to detect a chemical species.

20. The apparatus of claim 16, wherein the optical fibre has at least one further Bragg grating operable to sense a variable other than temperature, and wherein the processor is further operable to determine the variable other than temperature sensed by the at least one further Bragg grating.

21. The apparatus of claim 16, wherein the processor is operable to address the Bragg grating or gratings using wavelength division multiplexing.

22. The apparatus of claim 16, wherein the processor is operable to address the Bragg grating or gratings using time division multiplexing.

23. A tool for forming a component of composite material, comprising at least one source of heat and the apparatus of claim 1, each housing of the apparatus being embedded in the material of the tool and each housing being of material compatible with the material of the tool.

24. The tool of claim 23, comprising a controller for the source of heat, the controller being responsive to the temperature or temperatures measured by the apparatus to control the source of heat.

25. The tool of claim 24, wherein the source of heat comprises one or more heating devices embedded in the tool.

26. The tool of claim 25, wherein at least one housing containing a Bragg grating is associated with each heating device.

27. A structure comprising the apparatus of claim 1.

28. The structure of claim 27 in the form of a vehicle, an industrial plant or a civil engineering structure.

* * * * *